Aug. 2, 1932.  M. J. ADAMS  1,869,993
VEHICLE
Filed Feb. 6, 1930  4 Sheets-Sheet 1
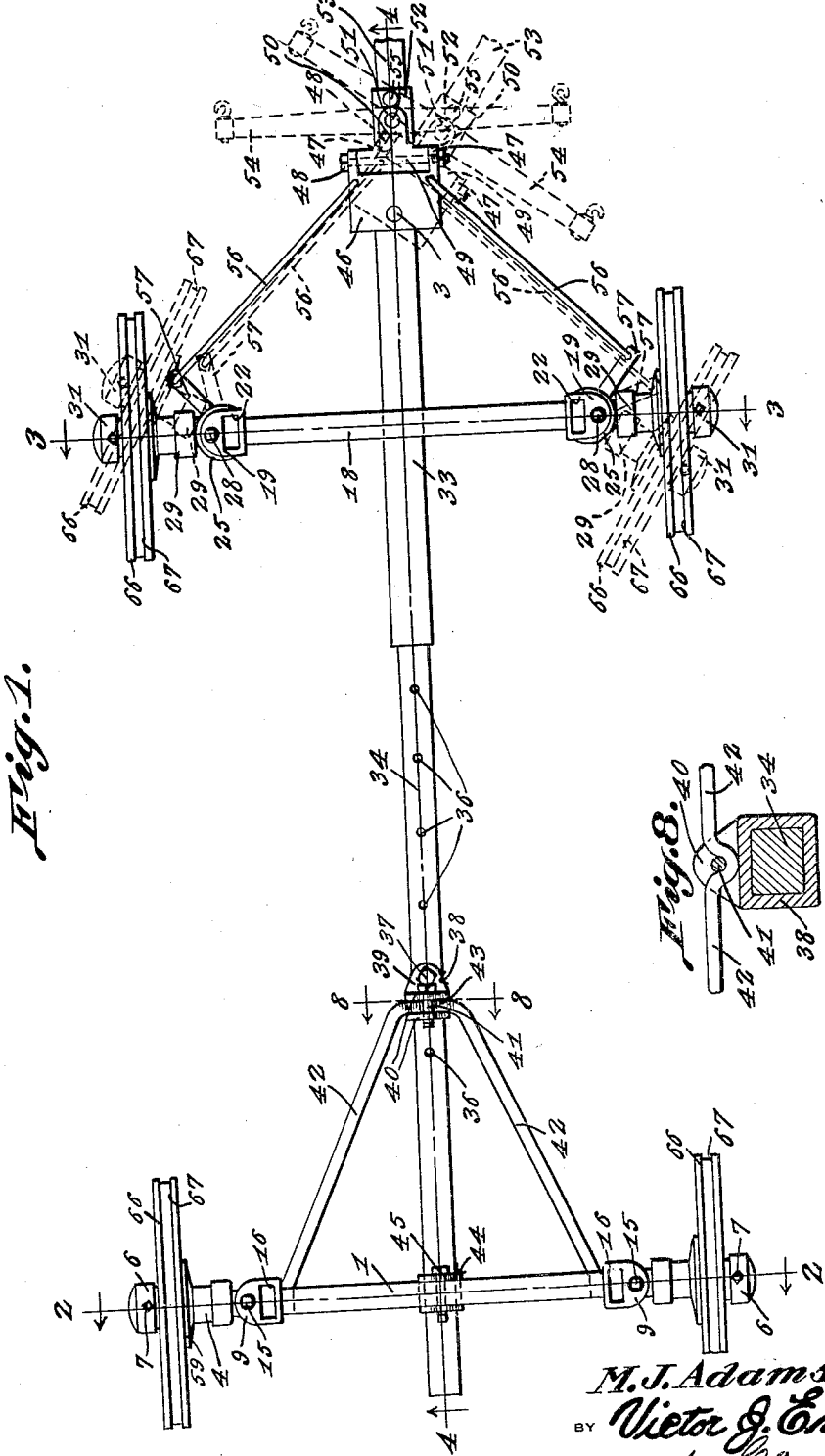
M. J. Adams, INVENTOR
BY Victor J. Evans
and Co  ATTORNEY Aug. 2, 1932. M. J. ADAMS 1,869,993
VEHICLE
Filed Feb. 6, 1930 4 Sheets-Sheet 2
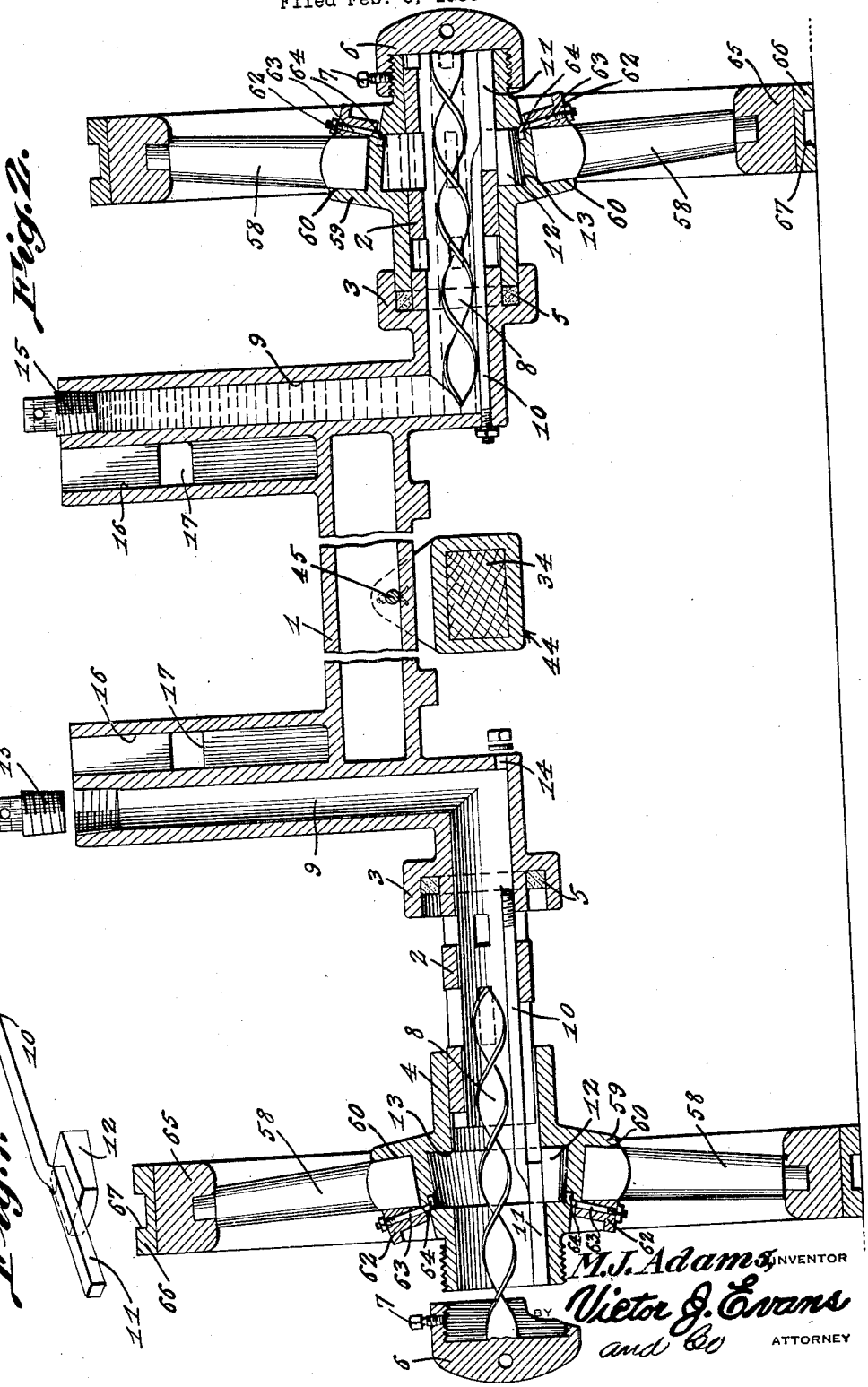

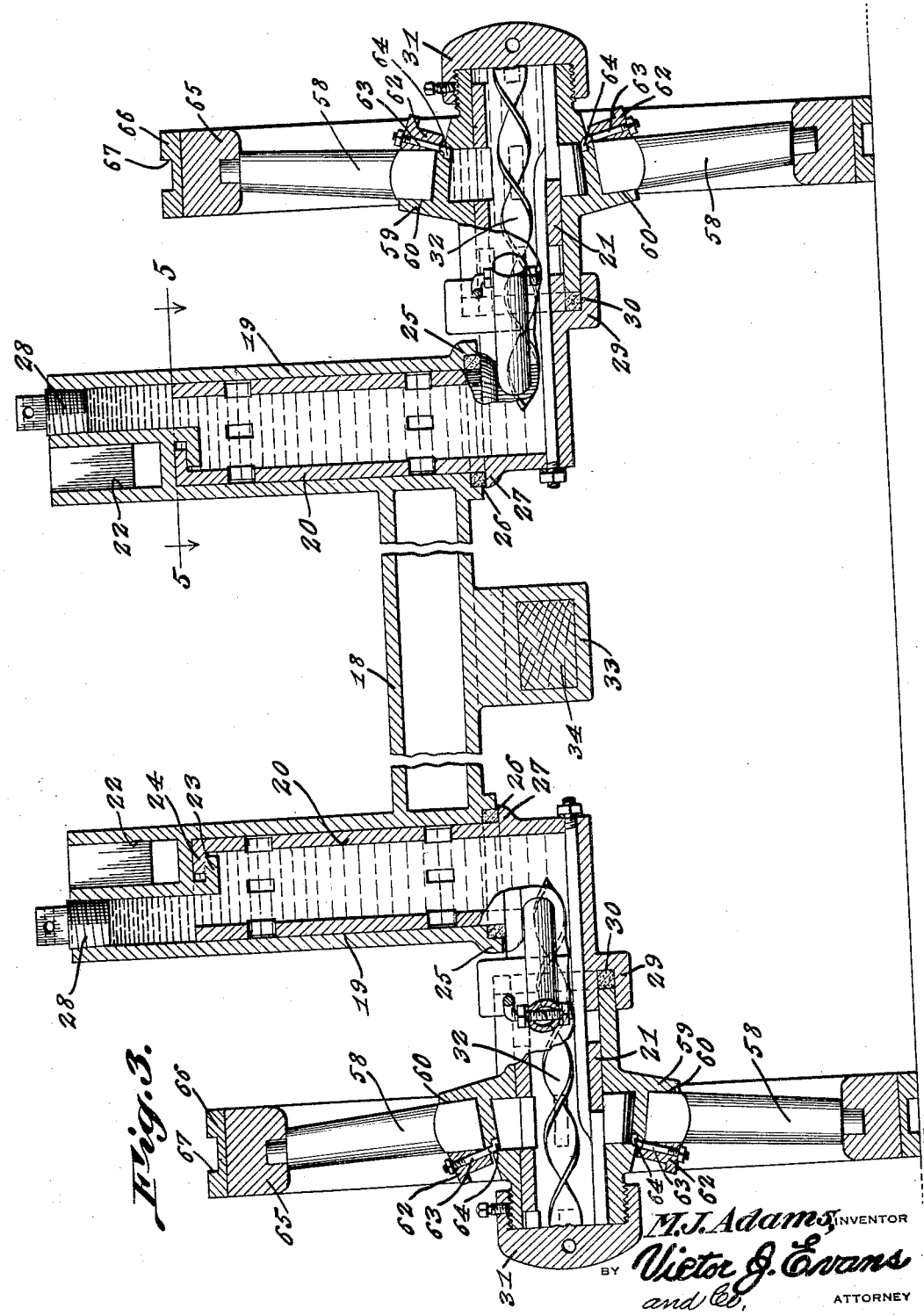

Aug. 2, 1932.   M. J. ADAMS   1,869,993
VEHICLE
Filed Feb. 6, 1930   4 Sheets-Sheet 4
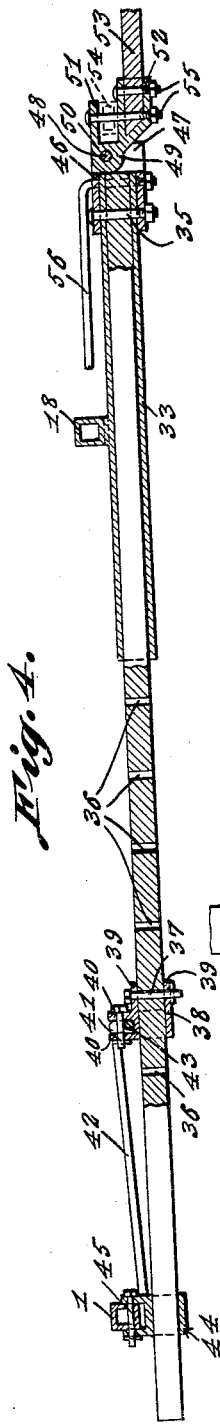
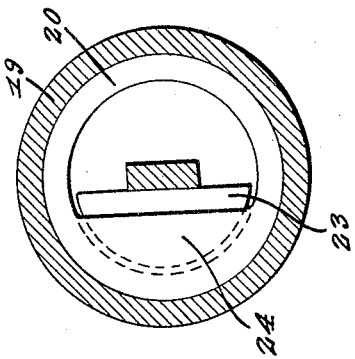
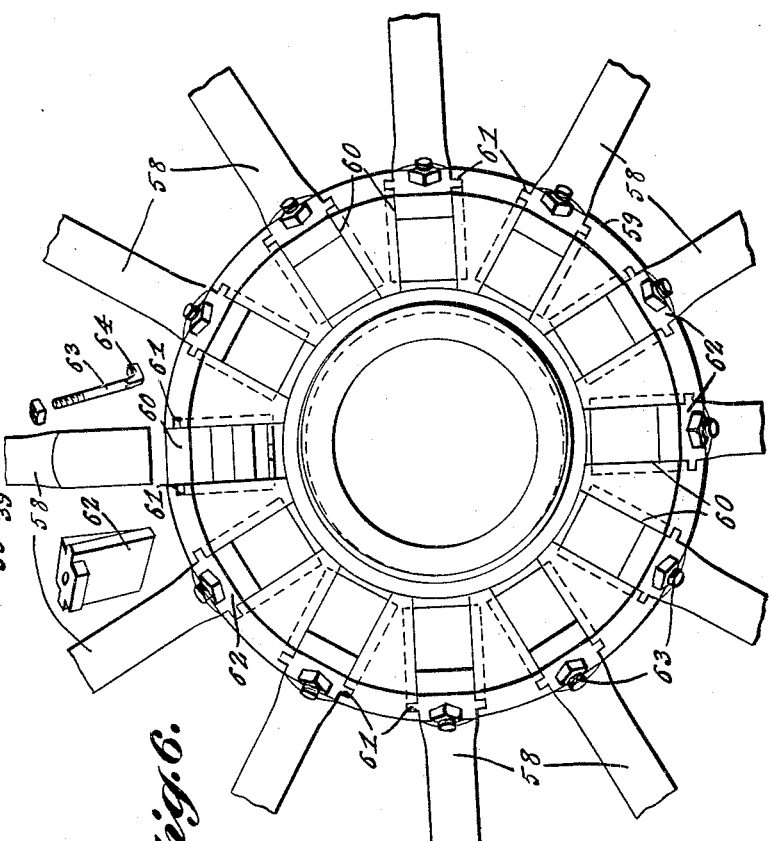
M. J. Adams, INVENTOR
BY Victor J. Evans
and Co   ATTORNEY Patented Aug. 2, 1932

1,869,993

UNITED STATES PATENT OFFICE

MATHIAS J. ADAMS, OF TURKEY RIVER, IOWA

VEHICLE

Application filed February 6, 1930. Serial No. 426,413.

This invention relates to land vehicles and its general object is to provide a vehicle, preferably of the horse drawn type that can be easily and quickly assembled as well as repaired accordingly in the event of damage thereto, and broken parts can be replaced without removing associated undamaged parts.

Another object of the invention is to provide a vehicle including front wheels that aid in steering the vehicle.

A still further object of the invention is to provide a vehicle having an adjustable running gear, whereby the axles can be adjusted with respect to each other with very little effort.

A further object of the invention is to provide a vehicle including lubricating means that requires very little attention and will retain the parts thoroughly lubricated for a prolonged period of time.

Another object of the invention is to provide a vehicle wheel having detachably associated spokes and a tire that will reduce slippage and lateral skidding.

A still further object of the invention is to provide a vehicle of the character set forth, that is reasonably simple in construction, considering the advantages derived from the elements thereof, and one that is extremely efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a top plan view illustrating the vehicle structure constructed in accordance with the present invention.

Figure 2 is a sectional view taken approximately on line 2—2 of Figure 1, looking in the direction of the arrows.

Figure 3 is a sectional view taken approximately on line 3—3 of Figure 1, looking in the direction of the arrows.

Figure 4 is a sectional view taken approximately on line 4—4 of Figure 1, looking in the direction of the arrows.

Figure 5 is a sectional view taken approximately on line 5—5 of Figure 3, looking in the direction of the arrows.

Figure 6 is a view of the wheel structure which forms a part of the present invention.

Figure 7 is a detail view of the wheel securing bolt means.

Figure 8 is a detail view of the bracket for the hound.

Referring to the drawings in detail, the reference numeral 1 indicates the rear axle of the vehicle and which is preferably hollow and formed from metal. Formed with the rear axle and extending from the opposite sides thereof are spindles 2 which are provided with slots arranged about the circumference thereof and these spindles are hollow and are of cylindrical formation as best shown in Figure 2. The spindles have formed therewith collars 3 for the purpose of accommodating the inner ends of the hubs 4 and arranged in the collars which have their outer portions disposed in spaced relation with respect to the hubs are gaskets 5 so as to provide a leak proof connection between the hub and collars as will be apparent.

The outer sides of the hubs 4 are threaded for the purpose of accommodating hub caps 6 which are provided with set screws 7 for holding the hub caps in operative position as shown, and formed with the hub caps and extending inwardly therefrom are spirally arranged rods 8 for a purpose which will be presently apparent and these spirally arranged rods 8 extend through the hubs and terminate into the bottom of oil reservoirs 9 which are formed with and rise from the axle as best shown in Figure 2. In order to secure the wheels to the spindles, I employ a means in the form of a bolt having a rounded portion 10 which is provided with a threaded end, and this rounded portion is formed with a squared portion 11 that has secured thereto a block 12, the latter being received within a groove 13 formed interiorly of the hub to prevent longitudinal movement of the bolt, and the rounded portion of the bolt extends through the spindle with its threaded end passed through an opening 14 for the purpose of receiving a washer and a nut as shown, and the engagement of the bolt within the groove will hold the wheel upon the spindle when the nut is threadedly secured to the rounded portion as will be apparent.

The reservoirs 9 are in communication with the hubs as shown, and extend upwardly therefrom. The upper ends of the reservoirs are interiorly threaded to accommodate plugs 15 and these reservoirs are adapted to receive lubricant in the form of oil which gravitates to the spindles, and due to the spirally arranged rods and the openings in the edges, the latter will be thoroughly lubricated at all times. From this construction, a year's supply of oil can be put in the reservoirs and the lubricating means will require no further attention.

Formed with the reservoirs and extending upwardly from the axle and in parallelism with the reservoirs are stake socket members 16 which of course are adapted to receive stakes or uprights when the wagon is adapted for the purpose of hauling lumber and the like. The sockets have arranged therein openings 17 to allow for the passage of moisture and foreign matter. The front axle is indicated by the reference numeral 18 and has formed with the ends thereof chambers 19 which act in the capacity of oil reservoirs and for the purpose of receiving for rotation therein upright sleeves 20 which are formed with the inner ends of the hubs 21 for the front axles, the hubs having openings arranged in the cylindrical portion thereof and being provided with open outer ends.

The upper ends of the chambers 19 are provided with stake sockets 22 and formed below the stake sockets are tongues 23 arranged in spaced relation with respect to the bottom of the stake sockets as best shown in Figure 3 for the purpose of accommodating tongues 24 formed with the inner side portions of the upper ends of the upright sleeves 20 whereby the upright sleeves 20 are held in cooperative association with respect to the chambers 19 for rotation therein as will be apparent. The sleeves 20 have formed therein openings to assure proper lubrication of the sleeves as the lubricant will pass through the openings for disposal between the sleeves and the chambers 19 and the sleeves are in communication with the cylindrical hubs 21 so that the lubricant will pass to the hubs. The lower ends of the chambers 19 are provided with flanges 25 which receive gaskets 26 and the sleeves 20 are formed with bearing bosses 27 which surround the sleeves and which engage the gaskets in a manner to provide a leak proof connection between the sleeves and the chambers 19. The upper ends of the chambers 19 are threaded to accommodate plugs 28. The hubs 21 have formed therewith collars 29 having their upper portions disposed in spaced relation with respect to the hubs and these collars receive gaskets 30 as well as the inner ends of the hubs as best shown in Figure 3. The outer ends of the hubs are screw threaded to receive hub caps 31 which are similar to the hub caps 6 and likewise are provided with set screws for holding the hub caps 31 in operative position. Extending inwardly from the hub caps and centrally formed therewith are spirally arranged rods 32 which have their inner ends terminating within the reservoir chambers 19 so that the lubricant will be agitated and caused to contact all the hub parts.

The front axle has formed to its lower end and centrally thereof a square in cross section sleeve member 33 through which passes the reach rod 34 and which is held therein through the instrumentality of a bolt and nut connection 35. Arranged in spaced relation and row formation in the reach rod 34 are a plurality of openings 36 for the purpose of receiving a bolt 37 that secures a bracket member 38 to the reach rod as best shown in Figure 4, and the bolt 37 passes through spaced parallel horizontally disposed ears 39 of the bracket member 38 which likewise is provided with spaced parallel vertically arranged ears 40 rising therefrom and which are formed with openings to receive a bolt 41. A substantially V-shaped hound 42 has its outer ends formed integral with the rear axle, and the apex of the hound 42 is crimped to provide what may be termed a bearing 43 which is held between the ears 40 through the instrumentality of the bolt 41. This construction provides for movement of the hound and therefore prevents binding. The reach rod 34 has slidably mounted thereon a bracket member 44 that is likewise provided with upstanding ears adapted to receive a bolt 45 that is passed through the rear axle for securing the latter with respect to the reach rod through the medium of the hounds. By this construction, it will be obvious that the axles are adjustable with respect to each other and this adjustment can be accomplished by associating the bolt 37 with any one of the openings in the reach rod, and of course the bracket members are slidably mounted on the reach rod to allow for the adjustment.

The bolt and nut connection 35 not only secures the reach rod in the sleeve member 33 but also pivotally secures plate member 46 to the sleeve member as clearly shown in Figure 4 of the drawings, and this plate member is provided with apertured ears 47 that receive the bolt and nut connection 48 which passes through a sleeve 49, the latter being formed with a bracket member 50 having an apertured lug 51 extending horizontally therefrom and in parallelism with a socket member 52 which receives the tongue 53, while disposed between the apertured lug 51 and the upper plate of the socket member 52 is a double tree 54, the latter being mounted for pivotal movement as will be apparent, and of course any type of similar means can be substituted therefor if desired. The single tree and the tongue are held in operative position through the instrumentality of bolt and nut connections 55.

The plate member is provided with openings to receive the adjacent ends of radius rods 56 while the opposite ends of these radius rods 56 are received in the outer ends of stub rods 57, the latter being formed with the lower ends of the upright sleeves and at the juncture thereof with the hubs 21 and in open communication with the sleeves so that the connection of the radius rods with the stub rods 57 will be amply lubricated. By this construction, it will be apparent that movement of the tongue will cause the turning of the front wheels as shown in dotted lines in Figure 1. The wheels include detachably associated spokes 58 so that in the event one or more of the spokes should become broken or damaged they can be easily and expeditiously replaced, and to accomplish this purpose, it will be noted that the hubs employed have circumferentially formed therewith and disposed at an outward inclination a ring member 59 which is provided at equidistantly spaced intervals, with sockets 60, the latter having arranged in its side walls longitudinally disposed recesses 61 for the purpose of accommodating the side edges of a wedge member 62 that is provided with one inclined face engageable with the adjacent face of the squared inner end of a spoke as will be noted upon inspection of Figure 3, as the sockets not only accommodate the wedge members but also the squared inner ends of the spokes. The wedge members are each provided with bores arranged centrally and longitudinally therethrough for the purpose of receiving bolts 63 that are provided with right angle bent ends 64 that are received in openings formed in the ring members as clearly shown in Figure 3. The bolts are held in operative association through the medium of nuts as shown, and in disposing the wedges in engagement with the spokes, and securing the same accordingly, the bolts are first placed in operative position, thence the wedges are received by the bolts and driven inwardly to the extent desired against the spokes, and then the nuts are applied.

The outer ends of the spokes are reduced in the usual manner and are received in fellies 65, the latter having secured thereto in any well known manner, tires of a particular construction, as it will be noted that these tires which are indicated by the reference numeral 66 are circumferentially grooved as at 67, the grooves being arranged midway between the side edges of the tires shown, and by this construction, it will be obvious that the groove will not only have a tendency to prevent slippage and lateral skidding, but in the event the tires are secured on the fellies through the instrumentality of bolt and nut connections, the heads of the bolts can be countersunk within the grooves.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. In a vehicle, a running gear including front and rear axles, oil reservoirs formed with said axles and rising therefrom, stake sockets formed with said oil reservoirs, spindles included in the rear axles and being hollow, sleeves mounted for rotation in the oil reservoirs of the front axle, spindles associated with said sleeves, wheels including hubs mounted for rotation on said spindles, the latter being provided with openings arranged about the circumference thereof, hub caps for said hubs, and oil agitating means carried by said hub caps.

2. In a vehicle, a running gear including front and rear axles, oil reservoirs formed with and rising from said axles, stake sockets formed with said oil reservoirs and arranged in parallelism therewith, hollow spindles included in the rear axle and being cylindrical in form, sleeves mounted for rotation in the oil reservoirs of the front axle, hollow spindles formed with said sleeves, collars formed with said spindles, wheels including hubs rotatably mounted on said spindles and having their inner ends received by the collars in a manner to provide a leak proof connection, and said spindles having oil passages and being in communication with the oil reservoirs.

3. In a vehicle, a running gear including front and rear axles, oil reservoirs formed with and rising from said axles, hollow spindles included in the rear axle and in communication with the oil reservoirs thereof, sleeves mounted for rotation in the oil reservoirs of the front axle, means for securing said sleeves in the last mentioned reservoirs, a leak proof connection between the latter and said sleeves, hollow spindles formed with said sleeves and being in communication with the oil reservoirs through the medium of the sleeves, wheels including hubs mounted for rotation on the spindles, the latter having oil passages, hub caps for said hubs and being threadedly secured thereto, agitating means carried by said hub caps and arranged in said hubs, bolt means for securing the hubs to the spindles and including blocks arranged in said hubs, and means cooperating with said hub caps for securing said bolt means in operative position.

4. In a vehicle, a running gear including front and rear axles, oil reservoirs formed with said axles and rising therefrom, hollow spindles included in the rear axles and in communication with the oil reservoirs thereof, sleeves mounted for rotation in the reservoirs of the front axle, hollow spindles associated with said sleeves and extending therefrom, said sleeves and hollow spindles having circumferentially arranged oil passages, wheels including hubs mounted for rotation on said spindles, hub caps for said hubs and being threadedly secured thereto, spiral rods extending inwardly from said hub caps and terminating in the oil reservoirs, bolt means including blocks for securing the hubs to the spindles, means for securing the bolt means in operative position, detachably mounted spokes for said wheels and grooved tires for said wheels.

In testimony whereof I affix my signature.

MATHIAS J. ADAMS.